United States Patent
Lee et al.

(10) Patent No.: US 9,664,965 B2
(45) Date of Patent: May 30, 2017

(54) LIQUID CRYSTAL DISPLAY DEVICE WITH A SHIELDING ELECTRODE

(71) Applicant: Samsung Display Co., Ltd., Yongin, Gyeonggi-Do (KR)

(72) Inventors: Seung-Kyu Lee, Cheonan-si (KR); Pil Gyu Kang, Yongin-si (KR); Wan Namgung, Asani-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 217 days.

(21) Appl. No.: 14/561,945

(22) Filed: Dec. 5, 2014

(65) Prior Publication Data

US 2016/0033810 A1    Feb. 4, 2016

(30) Foreign Application Priority Data

Jul. 29, 2014 (KR) .................. 10-2014-0096609

(51) Int. Cl.
G02F 1/1335 (2006.01)
G02F 1/1333 (2006.01)
G02F 1/1362 (2006.01)
G02F 1/1337 (2006.01)
G02F 1/1343 (2006.01)

(52) U.S. Cl.
CPC ...... G02F 1/136209 (2013.01); G02F 1/1362 (2013.01); G02F 1/13624 (2013.01); G02F 1/133707 (2013.01); G02F 2001/134345 (2013.01); G02F 2001/136218 (2013.01)

(58) Field of Classification Search
CPC .................. G02F 1/136209; G02F 1/1362
See application file for complete search history.

(56) References Cited

U.S. PATENT DOCUMENTS

| 8,345,199 B2 | 1/2013 | Hashimoto et al. |
| 2005/0119924 A1* | 6/2005 | Simpson ............ G06Q 30/0281 705/346 |
| 2015/0168793 A1* | 6/2015 | Oh ..................... G02F 1/133707 349/110 |

FOREIGN PATENT DOCUMENTS

| KR | 1020120088010 A | 8/2012 |
| KR | 1020130007312 A | 1/2013 |
| KR | 1020130032743 A | 4/2013 |

* cited by examiner

Primary Examiner — Joseph L Williams
(74) Attorney, Agent, or Firm — Robert E. Bushnell, Esq.

(57) ABSTRACT

An exemplary embodiment of the present invention provides a liquid crystal display (LCD) device including: a first insulation substrate; gate and data lines positioned on the first insulation substrate and electrically insulated to cross each other; a thin film transistor coupled to the gate line and the data line; a first light blocking member positioned on the data line; a shielding electrode positioned on the first light blocking member; a pixel electrode coupled to the thin film transistor; a second insulation substrate positioned to face the first insulation substrate; a common electrode positioned on the second insulation substrate; and a liquid crystal layer disposed between the pixel electrode and the common electrode.

14 Claims, 6 Drawing Sheets

LIQUID CRYSTAL DISPLAY DEVICE WITH A SHIELDING ELECTRODE

CROSS-REFERENCE TO RELATED APPLICATION

This application claims priority to and the benefit of Korean Patent Application No. 10-2014-0096609 filed in the Korean Intellectual Property Office on Jul. 29, 2014, the entire contents of which are incorporated herein by reference.

BACKGROUND

Field of the Invention

The present invention relates to a liquid crystal display device.

Description of the Related Art

As one of the most widely used flat panel displays (FPDs) at present, a liquid crystal display (LCD) is composed of two panels on which electrodes are formed, and a liquid crystal layer interposed between the two panels. The LCD generates an electric field on the liquid crystal layer by applying a voltage to the electrodes of the panels, realigns liquid crystal molecules of the liquid crystal layer through the generated field, and controls transmittance of light, thereby displaying an image.

In the LCD, an alignment layer is used to align the liquid crystal molecules of the liquid crystal layer in a desired direction. In addition, when the electric field is applied to the liquid crystal layer, the liquid crystal molecules are arranged such that they have pretilts in predetermine directions. To provide pretilts of the liquid crystal molecules, a method, in which a reactive mesogen is mixed in the liquid crystal layer for photopolymerization, is disclosed.

Meanwhile, as LCDs have recently become larger, curved display panels have also been developed to enhance immersion and realism of viewers. However, when the display panels are curved, the liquid crystal layer can be squashed, thereby causing leakage of light.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display (LCD) device with superior display quality.

In addition, the present invention has been made in an effort to provide a LCD device for preventing display quality deterioration or a short-circuit due to liquid crystals being squashed between two panels.

An exemplary embodiment of the present invention provides a liquid crystal display (LCD) device including: a first insulation substrate; a gate line positioned on the first insulation substrate, a data line disposed on the first insulation substrate with the data line crossing the gate line and being electrically insulated from the gate line; a thin film transistor coupled to the gate line and the data line; a first light blocking member positioned on the data line; a shielding electrode positioned on the first light blocking member; a pixel electrode coupled to the thin film transistor; a second insulation substrate positioned to face the first insulation substrate; a common electrode positioned on the second insulation substrate; and a liquid crystal layer disposed between the pixel electrode and the common electrode.

The LCD device may be curved.

The LCD device may further include: a first passivation layer positioned on the thin film transistor; a color filter positioned on the first passivation layer; and a second passivation layer positioned on the color filter and positioned on the first light blocking member.

The first light blocking member may partially overlaps the color filter.

Two adjacent color filters may not overlap each other.

The LCD device may further include a gate insulating layer positioned on the gate line.

The LCD device may further include: a first passivation layer positioned on the thin film transistor; a color filter positioned on the first passivation layer; and a second passivation layer positioned on the color filters. The first light blocking member may be positioned on the second passivation layer.

Adjacent color filters may overlap each other.

The first light blocking member may overlap the data line, and the liquid crystal display device may further includes a second light blocking member positioned on the second insulation substrate and overlapping the gate line.

The shielding electrode and the pixel electrode may be simultaneously formed of the same material.

The shielding electrode and the common electrode may be applied with the same voltage.

A surface of the first light blocking member contacting the shielding electrode may be flat.

The pixel electrode may include a first subpixel electrode and a second subpixel electrode, and the first and second subpixel electrodes may be separated from each other based on the gate line.

The liquid crystal display device may further include an overcoat layer positioned on the second insulation substrate.

According to the LCD device described above, even if the liquid crystal display is curvedly implemented, the display device for controlling luminance deterioration due to the light leakage and occurrence of the short-circuit between the upper and lower substrates can be provided.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, the thickness of layers, films, panels, regions, etc. are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display (LCD) device according to an exemplary embodiment of the present invention will now be described in detail with reference to the drawings.

Figure 1:
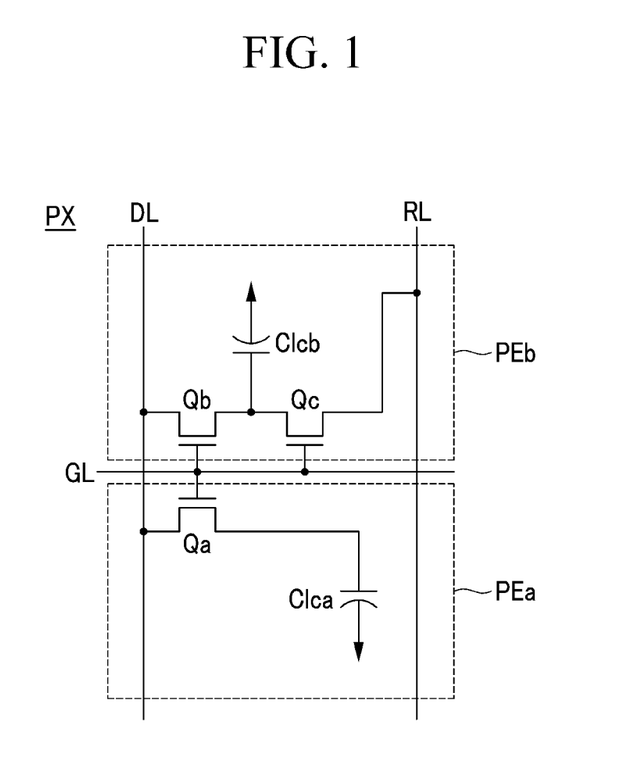
FIG. 1 is a circuit diagram of one pixel according to an exemplary embodiment of the present invention.

FIG. 1 is a circuit diagram of one pixel according to an exemplary embodiment of the present invention. Arrangement of signal lines and pixels of the LCD device according to exemplary embodiment of the present invention and a driving method thereof will be described with reference to FIG. 1.

One pixel PX of the LCD device includes a plurality of signal lines including a gate line GL for transmitting a gate signal, a data line DL for transmitting a data signal, and a divided reference voltage line RL for transmitting a divided reference voltage, and first, second, and third switching elements Qa, Qb, and Qc and first and second liquid crystal capacitors Clca and Clcb that are coupled to the plurality of signal lines.

The first and second switching elements Qa and Qb are respectively coupled to the gate line GL and the data line DL, and the third switching element Qc is coupled to an output terminal of the second switching element Qb and the divided reference voltage line RL. The first and second switching elements Qa and Qb are three-terminal elements such as a thin film transistor, control terminals thereof are coupled to the gate line GL, and input terminal thereof are coupled to the data line DL.

An output terminal of the first switching element Qa is coupled to the first liquid crystal capacitor Clca, and the output terminal of the second switching element Qb is coupled to the second liquid crystal capacitor Clcb and an input terminal of the third switching element Qc.

The third switching element Qc is also a three-terminal element such as a thin film transistor, a control terminal thereof is coupled to the gate line GL, the input terminal thereof is coupled to the second liquid crystal capacitor Clcb, and an output terminal thereof is coupled to the divided reference voltage line RL.

When a gate-on signal is applied to the gate line GL, the first switching element Qa, the second switching element Qb, and the third switching element Qc coupled thereto are turned on. Accordingly, a data voltage applied to the data line DL is applied to the first and second subpixel electrodes PEa and PEb through the turned on first and second switching elements Qa and Qb.

Since the data voltages applied to the first and second subpixel electrodes PEa and PEb are identical to each other, the first and second liquid crystal capacitors Clca and Clcb are charged up to a value corresponding to a difference between a common voltage and the data voltage, but simultaneously, the voltage charged in the second liquid crystal capacitor Clcb is divided by the turned-on third switching element Qc. Thus, the voltage charged in the second liquid crystal capacitor Clcb decreases by a difference between the common voltage and the divided reference voltage.

Since the voltage charged in the first liquid crystal capacitor Clca is different from the voltage charged in the second liquid crystal capacitor Clcb, inclination angles of the liquid crystal molecules in the first subpixel become different from those in the second subpixel, thereby causing luminances of the two subpixels to be different.

The voltages of the first and second liquid crystal capacitors Clca and Clcb are appropriately controlled such that an image viewed from a front side is almost identical to an image viewed from a lateral side, thereby improving side visibility.

In order for the voltages charged in the first and second liquid crystal capacitors Clca and Clcb to be different from each other, the exemplary embodiment is illustrated to include the third switching element Qc that is coupled to the second liquid crystal capacitor Clcb and the divided reference voltage line RL, but in some exemplary embodiments, a different configuration may be possible. For example, the second liquid crystal capacitor Clcb may be coupled to a step-down capacitor.

Specifically, by including a third switching element including a first terminal coupled to a step-down gate line, a second terminal coupled to the second liquid crystal capacitor Clcb, and a third terminal coupled to the step-down capacitor, an amount of charge in the second liquid crystal capacitor is partially charged in the step-down capacitor, thereby differently setting charging voltages of the first and second liquid crystal capacitors Clca and Clcb.

As another example, the first and second liquid crystal capacitors Clca and Clcb may be respectively coupled to different data lines such that they are applied with different data voltages, thereby differently setting charging voltages of the first and second liquid crystal capacitors Clca and Clcb.

Figure 2:
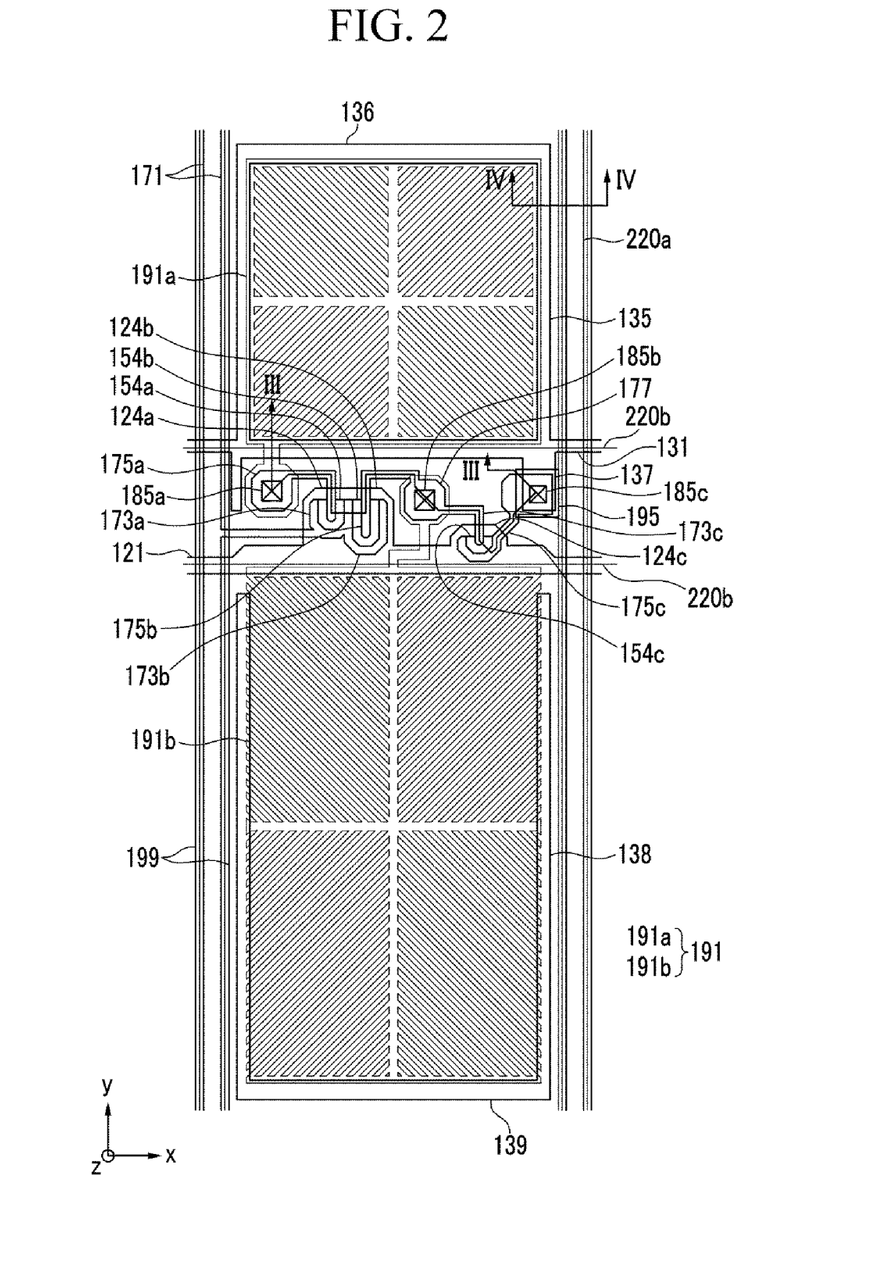
FIG. 2 is a top plan view of one pixel according to the exemplary embodiment of the present invention.
Figure 3:
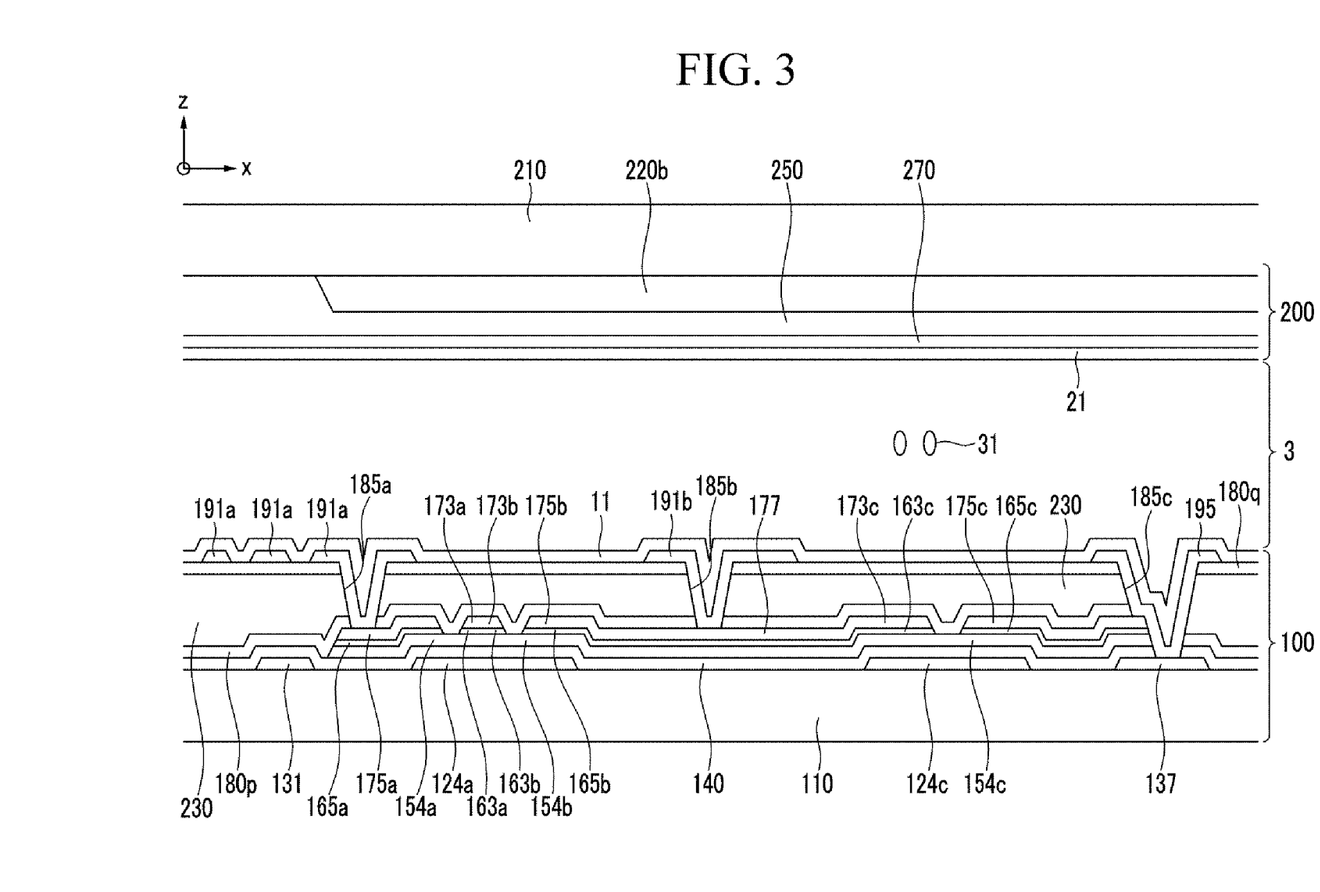
FIG. 3 is a cross-sectional view of FIG. 2 taken along the line III-III.
Figure 4:
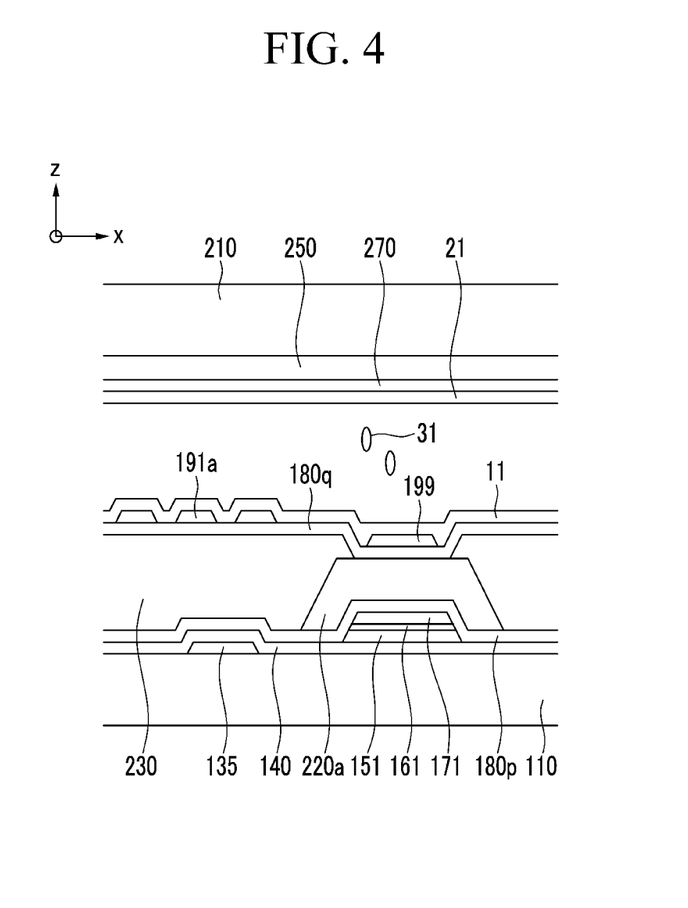
FIG. 4 is a cross-sectional view of FIG. 2 taken along the line IV-IV.
Figure 5:
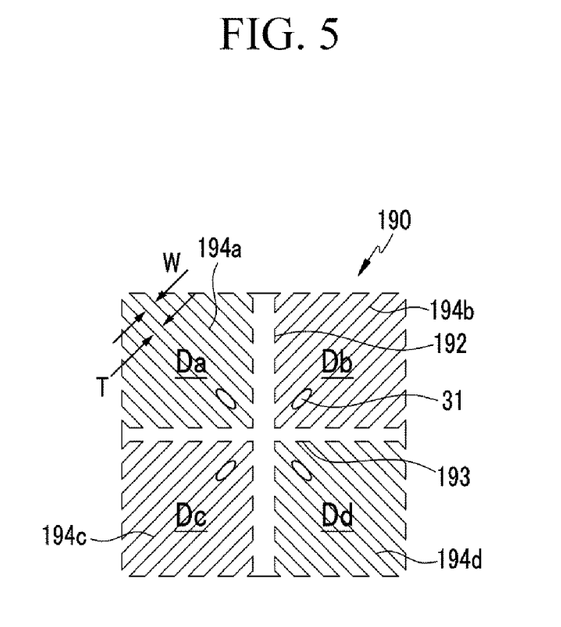
FIG. 5 is a top plan view of a basic region of a pixel electrode of a liquid crystal display (LCD) device according to the exemplary embodiment of the present invention.

Referring to FIGS. 2 to 5, a structure of the LCD device according to the exemplary embodiment illustrated in FIG. 1 will be described. FIG. 2 is a top plan view of one pixel according to the exemplary embodiment of the present invention, FIG. 3 is a cross-sectional view of FIG. 2 taken along the line III-III, FIG. 4 is a cross-sectional view of FIG. 2 taken along the line IV-IV, and FIG. 5 is a top plan view of a basic region of a pixel electrode of a liquid crystal display (LCD) device according to the exemplary embodiment of the present invention.

Referring to FIGS. 2 and 3, the LCD device according to the present exemplary embodiment includes: a lower panel 100 and an upper panel 200 facing each other; a liquid crystal layer 3 including liquid crystal molecules 31 interposed between the upper and lower panels 100 and 200; and a pair of polarizers (not shown) respectively attached to outer surfaces of the upper and lower panels 100 and 200.

The lower panel 100 will be described first.

A gate conductor including a gate line 121 and a divided reference voltage line 131 is positioned on a first insulation substrate 110. The gate line 121 includes a first gate electrode 124a, a second gate electrode 124b, a third gate electrode 124c, and a wide end portion (not shown) for connection with another layer or an external driving circuit.

The divided reference voltage line 131 includes first storage electrodes 135 and 136, and a reference electrode 137. Though not coupled to the divided reference voltage line 131, second storage electrodes 138 and 139 are also positioned.

A gate insulating layer 140 is positioned on the gate line 121 and the divided reference voltage line 131, and a first semiconductor layer 154a, a second semiconductor layer 154b, and a third semiconductor layer 154c are positioned on the gate insulating layer 140.

A plurality of ohmic contacts 163a, 165a, 16b, 165b, 163c, and 165c are positioned on the semiconductor layers 154a, 154b, and 154c.

A plurality of data lines 171 including first and second source electrodes 173a and 173b and a data conductor including a first drain electrode 175a, a second drain electrode 175b, a third source electrode 173c, and a third drain electrode 175c are positioned on the ohmic contacts 163a, 165a, 163b, 165b, 163c, and 165c and the gate insulating layer 140.

The data conductor and the semiconductor and ohmic contacts positioned thereunder may be simultaneously formed using one mask.

The data line 171 includes a wide end portion (not shown) for connection with another layer or an external driving circuit, and may include a semiconductor layer 151 and an ohmic contact 161 having the same planar shapes.

The first gate electrode 124a, the first source electrode 173a, and the first drain electrode 175a form a first thin film transistor Qa along with along with an island-like first semiconductor layer 154a, and a channel of the first thin film transistor is formed at the semiconductor layer 154a between the first source electrode 173a and the first drain electrode 175a.

Similarly, the second gate electrode 124b, the second source electrode 173b, and the second drain electrode 175b form a second thin film transistor Qb along with an island-like second semiconductor layer 154b, and a channel thereof is formed at the second semiconductor layer 154b between the second source electrode 173b and the second drain electrode 175b.

The third gate electrode 124c, the third source electrode 173c, and the third drain electrode 175c form a third thin film transistor Qc along with an island-like third semiconductor layer 154c, and a channel thereof is formed at the third semiconductor layer 154c between the third source electrode 173c and the third drain electrode 175c.

The second drain electrode 175b is coupled to the third source electrode 173c and includes a wide expansion 177.

A first passivation layer 180p is positioned on the data conductors 171, 173c, 175a, 175b, and 175c and the exposed semiconductor layers 154a, 154b, and 154c. The first passivation layer 180p may be an inorganic insulating layer that is formed of a silicon nitride or a silicon oxide. The first passivation layer 180p may prevent a pigment of a color filter 230 from flowing into the exposed semiconductor layer 154a, 154b, and 154c.

A first light blocking member 220a and the color filter 230 are positioned on the first passivation layer 180p, and the first light blocking member 220a is formed according to the exemplary embodiment of the present invention. The first light blocking member 220a may have a shape that is identical or similar to a shape of the data line 171, and is formed to cover the data line 171. Both of the first light blocking member 220a and the data line 171 extend along the y-axis shown in FIG. 2.

The color filter 230 extends in the y-axis direction along two data lines that are adjacent to each other. Two adjacent color filters 230 may not overlap each other, and particularly, may be separated from each other based on the data line 171 as shown in FIG. 4.

Based on the data line 171, the first light blocking member 220a covers the data line 171, and the color filter 230 may be positioned at lateral sides of the first light blocking member 220a. Accordingly, the first light blocking member 220a and the color filter 230 may partially overlap each other. A second passivation layer 180q is positioned on the color filter 230 and the first light blocking member 220a.

The second passivation layer 180q may be an inorganic insulating layer that is formed of a silicon nitride or a silicon oxide. The second passivation layer 180q prevents the color filter 230 from being lifted, and suppresses contamination of the liquid crystal layer 3 due to an organic material such as a solvent flowed from the color filter 230, thereby preventing an abnormality such as a residual image occurred when a screen is driven.

A first contact hole 185a and a second contact hole 185b are positioned in the first passivation layer 180p, the color filter 230, and the second passivation layer 180q to expose the first and second drain electrodes 175a and 175b.

A third contact hole 185c is positioned in the first passivation layer 180p, the second passivation layer 180q, and the gate insulating layer 140 to partially expose the reference electrode 137 and the third drain electrode 175c, and a connecting member 195 covers the third contact hole 185c.

The connecting member 195 electrically couples the reference electrode 137 to the third drain electrode 175c that are exposed by the third contact hole 185c.

A plurality of pixel electrodes 191 are positioned on the second passivation layer 180q. The respective pixel electrodes 191 are separated from each other while interposing the gate line 121 therebetween, and include a first subpixel electrode 191a and a second subpixel electrode 191b neighboring each other in a column direction based on the gate line 121. The pixel electrode 191 may be formed of a transparent conductive material such as indium tin oxide (ITO), indium zinc oxide (IZO), or the like, or a reflective metal such as aluminum, silver, chromium, or an alloy thereof.

The first and second subpixel electrodes 191a and 191b respectively include one or more electrode units 190 illustrated in FIG. 5, or variations thereof. The first and second subpixel electrodes 191a and 191b are physically and electrically coupled to the first and second drain electrodes 175a and 175b through the first and second contact holes 185a and 185b, respectively, and are applied with a data voltage from the first and second drain electrodes 175a and 175b, respectively. The data voltage applied to the second drain electrode 175b may be partially divided by the third source electrode 173c such that the voltage applied to the first subpixel electrode 191a is greater than that applied to the second subpixel electrode 191b.

The first and second subpixel electrodes 191a and 191b to which the data voltage is applied generate an electric field together with a common electrode 270 of the upper panel 200 that will be described later, thereby determining orientations of the liquid crystal molecules of the liquid crystal layer 3 between the two electrodes 191 and 270.

Luminance of light passing through liquid crystal layer 3 varies depending on the determined orientations of the liquid crystal molecules.

A shielding electrode 199 is positioned on the first light blocking member 220a, and may be positioned at the same layer as the pixel electrode 191. The shielding electrode 199 is positioned to overlap the data line 171, and particularly, may have a planar shape that is identical or similar to the shape of the data line 171. In other words, the shielding electrode 199 extends along the y-axis. The shielding electrode 199 is positioned at sides of one pixel area along edge thereof above the data lines 171. The shielding electrode 199 may not be positioned to be separated in each pixel area but may be formed as a continuous electrode across all adjacent pixels.

Since a surface where the shielding electrode 199 and the first light blocking member 220a contact each other is flatly formed, a stable electric field can be generated between the shielding electrode 199 and the common electrode 270 such that the liquid crystals may be controlled by the electric field.

The shielding electrode 199 may be formed of a transparent conductive material such as indium tin oxide (ITO), indium zinc oxide (IZO), or the like, or a reflective metal such as aluminum, silver, chromium, or an alloy thereof. That is, the shielding electrode 199 may be formed of the same material as or a different material from the pixel electrode 191. The shielding electrode 199 and the pixel electrode 191 may be simultaneously formed using the same mask.

Since the shielding electrode 199 is applied with the same voltage as the common electrode 270, no electric field is generated between the shielding electrode 199 and the common electrode 270 and thus the liquid crystal molecules disposed between the shielding electrode 199 and the common electrode 270 experience no orientation change regardless of the applied voltage. Thus, the liquid crystals positioned therebetween are in a black state and thus may perform a function like that of the light blocking member. Accordingly, the display device according to the exemplary embodiment of the present invention may be provided with a light blocking function performed by both the shielding electrode 199 and the first light blocking member 220a.

A lower alignment layer 11 is positioned on the pixel electrode 191.

Now, the upper panel 200 will be described.

A second light blocking member 220b is positioned on an insulation substrate 210. The second light blocking member 220b is referred to as a black matrix (BM), and prevents light leakage. The second light blocking member 220b may be positioned in a region on which the gate line 121 is formed. That is, the second light blocking member 220b may extend along the gate line 121 in an x-axis direction.

An overcoat layer 250 is formed on the second light blocking member 220b. The overcoat layer 250 may be formed of an organic insulator, and provides a flat surface. In some exemplary embodiments, the overcoat layer 250 may be omitted.

The common electrode 270 is formed on the overcoat layer 250. The common electrode 270 may commonly cover the pixels 191 and may be formed of a transparent conductor such as ITO, IZO, or the like.

An upper alignment layer 21 is formed on the common electrode 270.

The liquid crystal layer 3 includes the plurality of liquid crystal molecules 31, and the liquid crystal molecules 31 are aligned such that they are perpendicular to surfaces of the two substrates 110 and 210 when no voltage is applied to the electrodes 191 and 270 and such that they have pretilts that are inclined toward the same direction as a length direction of cutout patterns of the pixel electrode 191.

The display device as described above may be a curved display device.

In the display device according to the exemplary embodiment of the present invention, the shielding electrode generates a stable electric field with the common electrode of the upper substrate since it is positioned on the flat surface of the first light blocking member. Thus, the liquid crystals functioning to block light may be easily controlled. In addition, when the shielding electrode is formed at a position having a predetermined step where the color filters overlap, there may be a problem that a pattern is partially twisted when forming the shielding electrode.

However, according to the exemplary embodiment of the present invention, the patterns are stably formed since the shielding electrode is formed on the flat surface of the first light blocking member.

In addition, thanks to the first light blocking member and the shielding electrode that are flatly formed without having additional steps, a short circuit between the upper and lower substrates can be prevented even if the display device is curved.

In addition, as the first light blocking member is positioned in the lower substrate, both the first light blocking member and the shielding electrode control the light leakage that is generated around the data line. Accordingly, the luminance of the display device is improved.

An electrode unit 190 of the pixel electrode 191 will be described with reference to FIG. 5. As shown in FIG. 5, the electrode unit 190 substantially has a quadrangular shape, and includes a cross-shaped stem portion that is composed of a second stem portion 193 extending in a direction, and a first stem portion 192 extending perpendicular to the second stemp portion 193.

Further, the electrode unit 190 is divided into a first subregion Da, a second subregion Db, a third subregion Dc, and a fourth subregion Dd by the second and first stem portions 193 and 192, and the first to fourth subregions Da, Db, Dc, and Dd respectively include a plurality of first fine branch portions 194a, a plurality of second fine branch portions 194b, a plurality of third fine branch portions 194c, and a plurality of fourth fine branch portions 194d.

The first fine branch portions 194a obliquely extend from the second stem portion 193 or first stem portion 192 in an upper left direction as shown FIG. 5, and the second fine branch portions 194b obliquely extend from the second stem portion 193 or first stem portion 192 in an upper right direction.

The third fine branch portions 194c obliquely extend from the second stem portion 193 or first stem portion 192 in a lower left direction, and the fourth fine branch portions 194d obliquely extend from the second stem portion 193 or first stem portion 192 in a lower right direction.

The first to fourth fine branch portions 194a, 194b, 194c, and 194d substantially form an angle of 45° or 135° with the gate lines 121a and 121b or second stem portion 193.

In addition, the fine branch portions 194a, 194b, 194c, and 194d of two neighboring subregions Da, Db, Dc, and Dd may cross each other.

Widths W of the fine branch portions 194a, 194b, 194c, and 194d may be about 2.5 μm to 5.0 μm, and intervals T between the neighboring fine branch portions 194a, 194b, 194c, and 194d in the respective subregions Da, Db, Dc, and Dd may be about 2.5 μm to 5.0 μm.

According to another exemplary embodiment of the present invention, the widths of the fine branch portions 194a, 194b, 194c, and 194d may become wider closer to the second stem portion 193 or first stem portion 192, and a difference between the largest width and the smallest width in the respective fine branch portions 194a, 194b, 194c, and 194d may be about 0.2 μm to 1.5 μm.

The first and second subpixel electrodes 191a and 191b are coupled to the first drain electrode 175a or second drain electrode 175b through the first and second contact holes 185a and 185b, and are applied with the data voltage from the first and second drain electrodes 175a and 175b, respectively.

In this case, sides of the first to fourth fine branch portions 194a, 194b, 194c, and 194d distort the electric field to generate a horizontal component (component in x-y plane) that determines the inclination directions of the liquid crystal molecules 31. The horizontal component of the electric field is nearly parallel to the sides of the first to fourth fine branch portions 194a, 194b, 194c, and 194d. Thus, the liquid crystal molecules 31 are inclined, as shown in FIG. 5, in a direction parallel to a length direction (extending direction) of the fine branch portions 194a, 194b, 194c, and 194d.

Since one pixel electrode 191 includes the four subregions Da to Dd respectively having different length directions, the liquid crystal molecules 31 are substantially inclined in four directions, thereby forming four domains having different alignment directions of the liquid crystal molecules 31 in the liquid crystal layer 3. As such, when the liquid crystal molecules are inclined in various directions, a reference viewing angle of the LCD becomes wider.

Figure 6:
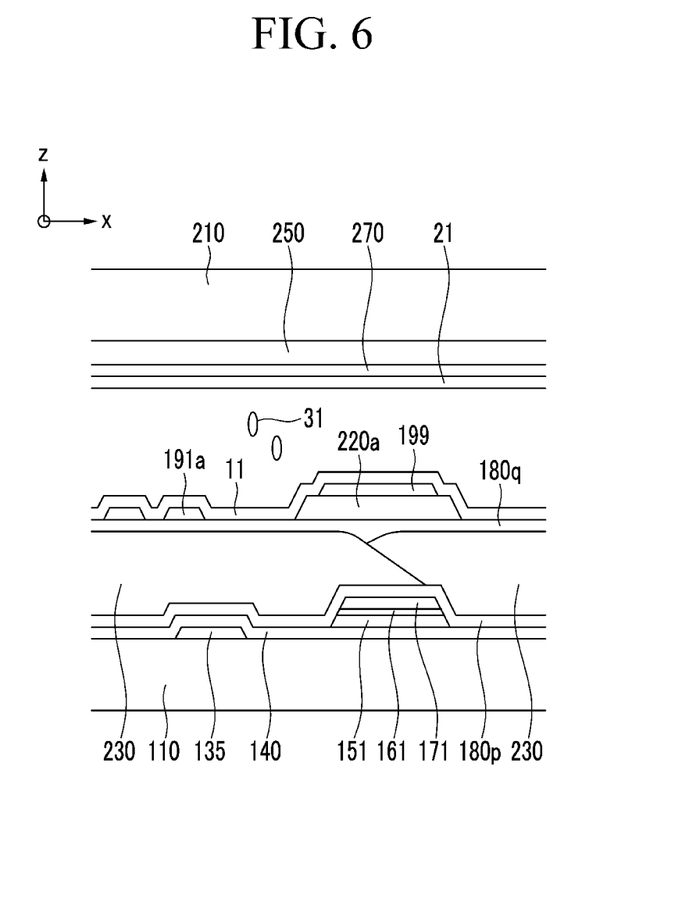
FIG. 6 is a cross-sectional view of FIG. 2 taken along the line IV-IV according to another exemplary embodiment of the present invention.

A liquid crystal display (LCD) according to another exemplary embodiment of the present invention will now be described with reference to FIG. 6. FIG. 6 is a cross-sectional view of FIG. 2 taken along the line IV-IV according to another exemplary embodiment of the present invention.

Descriptions of the elements that are identical or similar to those described above will be omitted. The display device according to the current exemplary embodiment of the present invention may have the same lamination structure as the display device according to the exemplary embodiment until the first passivation layer 180p is formed.

Next, a color filter 230 is positioned on the first passivation layer 180p. The color filter 230 extends in a y-axis direction along two adjacent data lines. In this embodiment, two adjacent color filters 230 may overlap each other, and particularly, may be formed to overlap near the data line 171.

Next, a second passivation layer 180q is positioned on the color filter 230. The second passivation layer 180q may be an inorganic insulating layer that is formed of a silicon nitride or a silicon oxide. The second passivation layer 180q prevents the color filter 230 from being lifted, and suppresses contamination of the liquid crystal layer 3 due to an organic material such as a solvent flowed from the color filter 230, thereby preventing an abnormality such as a residual image occurred when a screen is driven.

A first contact hole 185a and a second contact hole 185b are positioned in the first passivation layer 180p, the color filter 230, and the second passivation layer 180q to expose the first and second drain electrodes 175a and 175b.

A third contact hole 185c is positioned in the first passivation layer 180p, the second passivation layer 180q, and the gate insulating layer 140 to partially expose the reference electrode 137 and the third drain electrode 175c, and a connecting member 195 covers the third contact hole 185c.

The connecting member 195 electrically couples the reference electrode 137 and the third drain electrode 175c that are exposed by the third contact hole 185c.

A first light blocking member 220a is positioned on the second passivation layer 180q. The first light blocking member 220a may have a planar shape that is identical or similar to a shape of the data line 171, and is formed to overlap (or to cover) the data line 171.

A plurality of pixel electrodes 191 are positioned on the second passivation layer 180q. The respective pixel electrodes 191 are separated from each other while interposing the gate line 121 therebetween, and include a first subpixel electrode 191a and a second subpixel electrode 191b neighboring each other in a column direction based on the gate line 121. The pixel electrode 191 may be formed of a transparent conductive material such as ITO, IZO, or the like, or a reflective metal such as aluminum, silver, chromium, or an alloy thereof.

The first and second subpixel electrodes 191a and 191b respectively include one or more electrode units 190 illustrated in FIG. 5 or variations thereof. The first and second subpixel electrodes 191a and 191b are physically and electrically coupled to the first and second drain electrodes 175a and 175b through the first and second contact holes 185a and 185b, and are applied with a data voltage from the first and second drain electrodes 175a and 175b, respectively.

The data voltage applied to the second drain electrode 175b may be partially divided by the third source electrode 173c such that the voltage applied to the first subpixel electrode 191a is greater than that applied to the second subpixel electrode 191b.

The first and second subpixel electrodes 191a and 191b to which the data voltage is applied generate an electric field together with the common electrode 270 of the upper panel 200, thereby determining orientations of the liquid crystal molecules of the liquid crystal layer 3 between the two electrodes 191 and 270.

Luminance of light passing through liquid crystal layer 3 varies depending on the determined orientations of the liquid crystal molecules.

A shielding electrode 199 is positioned on the first light blocking member 220a, and may be positioned at the same layer as the pixel electrode 191. The shielding electrode 199 is positioned to overlap (or to cover) the data line 171, and particularly, may have a planar shape that is identical or similar to the shape of the data line 171. The shielding electrode 199 is positioned at sides of one pixel area along an edge thereof above the data lines 171. The shielding electrode 199 may not be positioned to be separated in each pixel area, but may be formed as a continuous electrode across all adjacent pixels.

Since a surface where the shielding electrode 199 and the first light blocking member 220a contact each other is smoothly formed, generation of a stable electric field between the shielding electrode 199 and the common electrode 270 is possible, thereby allowing liquid crystal control.

The shielding electrode 199 may be formed of a transparent conductive material such as ITO or IZO, or a reflective metal such as aluminum, silver, chromium, or an alloy thereof. That is, the shielding electrode 199 may be formed of the same material as the pixel electrode 191 or other materials. The shielding electrode 199 and the pixel electrode 191 may be simultaneously formed using the same mask.

Since the shielding electrode 199 is applied with the same voltage as the common electrode 270, no electric field is generated between the shielding electrode 199 and the common electrode 270, and thus the liquid crystal molecules disposed between the shielding electrode 199 and the common electrode 270 experience no orientation change regardless of the applied voltage. Thus, the liquid crystals positioned therebetween are in a black state and thus may perform a function like that of the light blocking member.

Accordingly, the display device according to the exemplary embodiment of the present invention may be provided with a light blocking function performed by both the shielding electrode 199 and the first light blocking member 220a.

A lower alignment layer 11 is positioned on the pixel electrode 191 and on the shielding electrode 199. The elements of the upper substrate according to the current exemplary embodiment of the present invention may be the same as or similar to those of the exemplary embodiment of the present invention.

The display device as described above may be a curved display device.

In the display device according to the exemplary embodiment of the present invention, the shielding electrode generates a stable electric field with the common electrode of the upper substrate since it is positioned on the flat surface of the first light blocking member. Thus, the liquid crystals functioning to block light may be easily controlled.

In addition, when the shielding electrode is formed at a position having a predetermined step where the color filters overlap, there may be a problem that a pattern is partially twisted when forming the shielding electrode. However, according to the exemplary embodiment of the present invention, the patterns are stably formed since the shielding electrode is formed on the flat surface of the first light blocking member.

In addition, thanks to the first light blocking member and the shielding electrode that are flatly formed without having additional steps, a short circuit between the upper and lower substrates can be prevented even if the display device is curved.

In addition, as the first light blocking member is positioned in the lower substrate, the first light blocking member and the shielding electrode control the light leakage that is generated around the data line. Accordingly, the luminance of the display device is improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) device, comprising:
    a first insulation substrate;
    a gate line disposed on the first insulation substrate;
    a data line disposed on the first insulation substrate, the data line crossing the gate line and being electrically insulated from the gate line;
    a thin film transistor coupled to the gate line and the data line;
    a first light blocking member disposed on the data line;
    a shielding electrode disposed on the first light blocking member;
    a pixel electrode coupled to the thin film transistor;
    a second insulation substrate disposed to face the first insulation substrate;
    a common electrode disposed on the second insulation substrate; and
    a liquid crystal layer disposed between the pixel electrode and the common electrode.

2. The liquid crystal display device of claim 1, wherein the liquid crystal display device is curved.

3. The liquid crystal display device of claim 1, further comprising:
    a first passivation layer positioned on the thin film transistor;
    a color filter positioned on the first passivation layer; and
    a second passivation layer positioned on the color filter and positioned on the first light blocking member.

4. The liquid crystal display device of claim 3, wherein the first light blocking member partially overlaps the color filter.

5. The liquid crystal display device of claim 3, wherein two adjacent color filters do not overlap each other.

6. The liquid crystal display device of claim 1, further comprising a gate insulating layer positioned on the gate line.

7. The liquid crystal display device of claim 1, further comprising:
    a first passivation layer positioned on the thin film transistor;
    color filters positioned on the first passivation layer; and
    a second passivation layer positioned on the color filters, the first light blocking member positioned on the second passivation layer.

8. The liquid crystal display device of claim 6, wherein adjacent color filters overlap each other.

9. The liquid crystal display device of claim 1, wherein the first light blocking member overlaps the data line, the liquid crystal display device further comprising a second light blocking member positioned on the second insulation substrate and overlapping the gate line.

10. The liquid crystal display device of claim 1, wherein the shielding electrode and the pixel electrode are simultaneously formed of the same material.

11. The liquid crystal display device of claim 10, wherein the shielding electrode and the common electrode are applied with the same voltage.

12. The liquid crystal display device of claim 1, wherein a surface of the first light blocking member contacting the shielding electrode is flat.

13. The liquid crystal display device of claim 1, wherein the pixel electrode includes a first subpixel electrode and a second subpixel electrode, and the first and second subpixel electrodes are separated from each other based on the gate line.

14. The liquid crystal display device of claim 1, further comprising an overcoat layer positioned on the second insulation substrate.

* * * * *